(12) United States Patent
Eichorst et al.

(10) Patent No.: US 12,730,073 B2
(45) Date of Patent: Sep. 8, 2026

(54) OPTICAL CONFIGURATIONS FOR HIGH RESOLUTION MICROSCOPY

(71) Applicant: THERMO ELECTRON SCIENTIFIC INSTRUMENTS LLC, Madison, WI (US)

(72) Inventors: John Eichorst, Verona, WI (US); Julian Irwin, Madison, WI (US)

(73) Assignee: THERMO ELECTRON SCIENTIFIC INSTRUMENTS LLC, Madison, WI (US)

( * ) Notice: Subject to any disclaimer, the term of this patent is extended or adjusted under 35 U.S.C. 154(b) by 218 days.

(21) Appl. No.: 18/627,152

(22) Filed: Apr. 4, 2024

(65) Prior Publication Data

US 2025/0314587 A1 Oct. 9, 2025

(51) Int. Cl.
*G01N 21/65* (2006.01)

(52) U.S. Cl.
CPC ......... *G01N 21/65* (2013.01); *G01N 2201/02* (2013.01); *G01N 2201/063* (2013.01)

(58) Field of Classification Search
CPC ......... G02B 21/0024; G01N 2201/063; G01N 21/65
See application file for complete search history.

(56) References Cited

FOREIGN PATENT DOCUMENTS

CN 114609050 A 6/2022

OTHER PUBLICATIONS

Shujun Zheng, "Scalar vortex beam produced through faithful reconstruction of polarization holography", 2021 (Year: 2021).*
Zheng in view of Thorlabs, "Create Circularly Polarized Light Using a Quarter-Wave Plate (QWP) | Thorlabs Insights", Jan. 19, 2021 (Year: 2021).*
Dehez et al., "Resolution and contrast enhancement in laser scanning microscopy using dark beam imaging," Optics Express, 2013, vol. 21, No. 13, pp. 15912-15925.
You et al., "Eliminating deformations in fluorescence emission difference microscopy," Optics Express, 2014, vol. 22, No. 21, pp. 26375-26385.
Wang et al., "Numerical study of the subtraction threshold for fluorescence difference microscopy," Optics Express, 2014, vol. 22, No. 23, pp. 28819-28830.

(Continued)

*Primary Examiner* — Maurice C Smith
(74) *Attorney, Agent, or Firm* — Michael Best & Friedrich LLP

(57) ABSTRACT

Optical configurations for confocal structured illumination Raman (C-SIM Raman) microscopy systems are provided. One example includes a light source configured to project a light; a first set of optical components fixedly aligned along a first optical path, wherein the first set of optical components includes a vortex phase plate and a quarter wave plate, wherein the first set of optical components is configured to receive the light; and a second set of optical components configured to be adjusted between a first operating position and a second operating position. When in the first operating position, the second set of optical component is aligned on the first optical path and is configured to expand, in conjunction with the first set of optical components, the light into an expanded light. When in the second operating position, the second set of optical components is not aligned on the first optical path.

16 Claims, 17 Drawing Sheets

(56) References Cited

OTHER PUBLICATIONS

Tian et al., "Resolution and contrast enhancements of subtractive second harmonic generation microscopy with a circularly polarized vortex beam," Scientific Reports, 2015, 5, 8 pages.

Thibon et al., "Resolution enhancement in confocal microscopy using Bessel-Gauss beams," Optics Express, 2017, vol. 25, No. 3, pp. 2162-2177.

Kuang et al., "Breaking the diffraction barrier using fluorescence emission difference microscopy," Scientific Reports, 2013, 3, 6 pages.

Gasecka et al., "Resolution and contrast enhancement in coherent anti-Stokes Raman-scattering microscopy," Optics Letters, 2013, vol. 38, No. 21, pp. 4510-4513.

Korobchevskaya et al., "Intensity weighted subtraction microscopy approach for image contrast and resolution enhancement," Scientific Reports, 2016, 6, 9 pages.

Kumbham et al., "Spatial-domain filter enhanced subtraction microscopy and application to mid-IR imaging," Optics Express, 2017, vol. 25, No. 12, pp. 13145-13152.

U.S. Appl. No. 18/296,859, filed Apr. 6, 2023, by Eichorst. (Copy not submitted herewith pursuant to the waiver of 37 C.F. R. § 1.98(a)(2)(iii) issued by the Office on Oct. 19, 2004).

EP25167833.0, Extended European Search Report, Aug. 19, 2025, 12 pages.

Li S., et al., "Enhancing the Performance of Fluorescence Emission Difference Microscopy Using Beam Modulation," Journal of Optics, Oct. 24, 2013, vol. 15, No. 12, XP020255104, 8 pages.

Xiao S., et al., "Contrast Improvement in Two-photon Microscopy with Instantaneous Differential Aberration Imaging," Biomedical Optics Express, May 1, 2019, vol. 10, No. 5, XP055866876, pp. 2467-2477.

* cited by examiner

100

OPTICAL CONFIGURATIONS FOR HIGH RESOLUTION MICROSCOPY

FIELD

The present disclosure generally relates to systems and methods for conducting high resolution microscopy, such as Raman spectroscopy.

BACKGROUND

Super-resolution imaging is a set of techniques that can be used to increase the resolution of microscope imaging beyond the diffraction limit of a standard confocal microscope system. An example super-resolution imaging technique is confocal structured illumination (C-SIM) Raman microscopy which improves the lateral resolution of Raman microscopes beyond the diffraction limit. C-SIM microscopy includes imaging a sample with a standard confocal scan spot and, separately, with a donut-shaped scan spot. Super-resolution is achieved by the subtraction of these two images.

SUMMARY

In one aspect, an optical system for structured illumination includes a first set of optical components fixedly aligned relative to a light beam entering the optical system and a second set of optical components adjustable between a first operating position and a second operating position. When the second set of optical components are in the first operating position, the light beam is expanded and outputted as a first output beam. When the second set of optical components are in the second operating position, the light beam passes through the first set of optical components and forms a vortex beam that is outputted as a second output beam.

In some aspects, the optical system is included in a structured illumination microscopy system. The microscopy system includes a light source configured to generate a light beam, the light beam received by the optical system. The microscopy system includes at least one actuator to adjust the second set of optical components between the first operating position and the second operating position, an objective to direct either the first output beam or the second output beam to a sample, a detector for receiving light from the sample, and a controller including a processor and a non-transitory memory for storing computer readable instructions. When the computer readable instructions are executed by the processor, the microscopy system is configured to adjust, via the actuator, the second set of optical components in the first operating position, direct the first output beam towards the sample and generate a first image based on light received from the detector, adjust, via the actuator, the second set of optical components in the second operating position, direct the second output beam towards the sample and generate a second image based on light received from the detector, and generate a sample image based on first image and the second image.

There is no specific requirement that a system, method, or technique relating to C-SIM microscopy include all of the details characterized herein to obtain some benefit according to the present disclosure. Thus, the specific examples characterized herein are meant to be example applications of the techniques described and alternatives are possible.

BRIEF DESCRIPTION OF THE DRAWINGS

Features and advantages of the present technology will become more apparent from the following detailed description of example embodiments thereof taken in conjunction with the accompanying drawings in which.

Figures 1A, 1B, 1C:
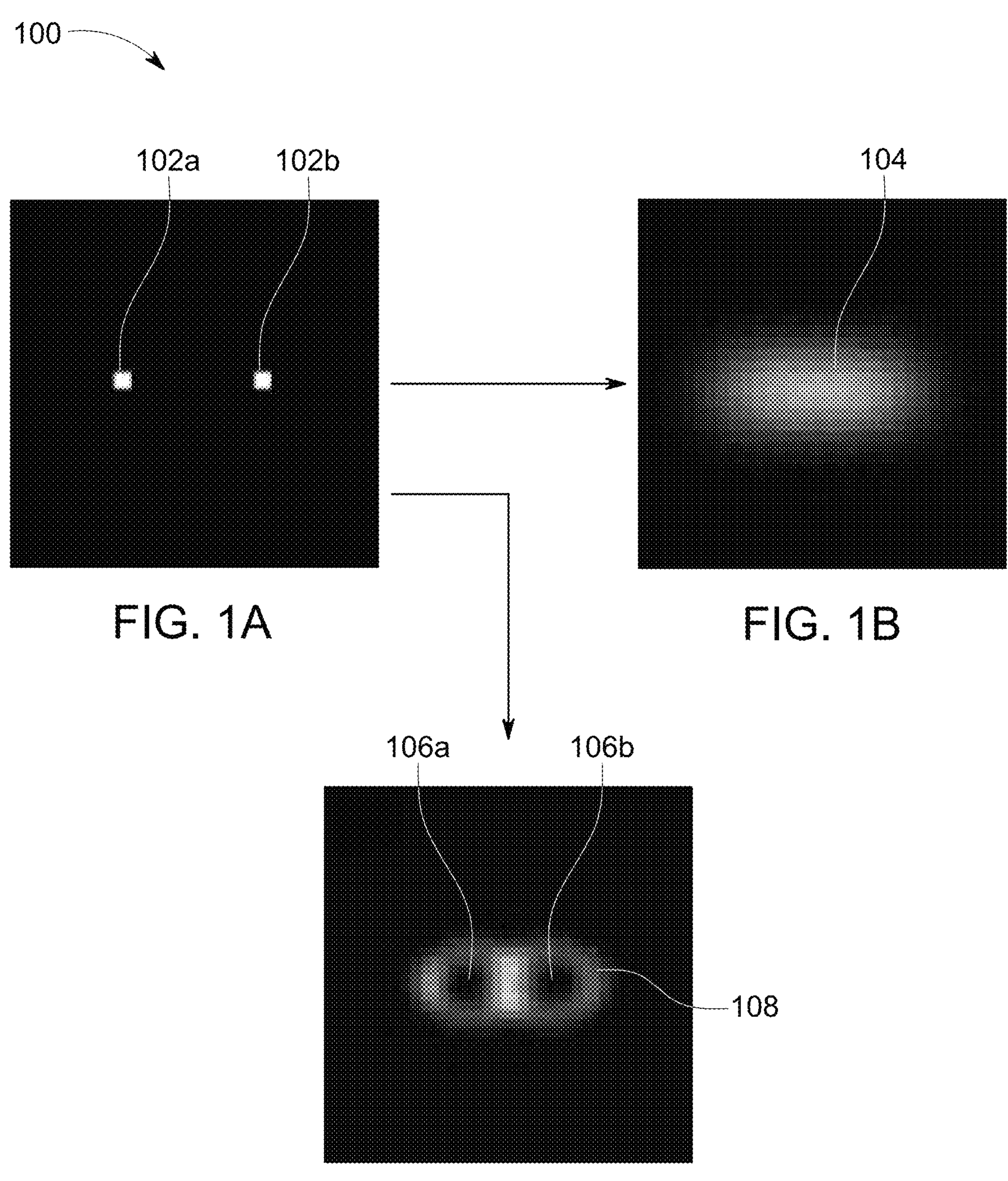
FIGS. 1A, 1B, 1C, and 1D are simulated images depicting a subtraction microscopy process.

While the present technology is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

Confocal structured illumination (C-SIM) Raman microscopy is a technique that may be used to improve the lateral resolution of Raman microscopes beyond the diffraction limit. Using C-SIM (also referred to as difference microscopy or fluorescence difference microscopy), the lateral resolution of the microscope can be improved by up to around 40% through a subtraction process. An image acquired by scanning a toroidal-shaped focused spot across a sample can be subtracted from an image acquired by scanning with a non-toroidal shaped focused spot (also referred herein as a confocal microscopy spot). To produce the toroidal-shaped focused spot, a vortex generator can be added along the path of a Gaussian beam to generate a vortex beam. The vortex beam may be focused to create a toroid shape spot at the sample plane which contains an inner dark area that can be smaller than the resolution allowed by the objective lens. In general, toroidal shapes are circular- or donut-shaped, though it is appreciated that other shapes can be toroidal, such as elliptical, oval, square, and the like.

In some examples, the vortex generator may include a vortex phase pate (VPP). A quarter wave plate may be positioned behind the VPP to add a circular polarization to the vortex beams, thereby improving the contrast between the center and edges of donut-shaped scan spots. In other examples, the vortex generator may include an azimuthal polarizer to form an azimuthally polarized light. In some examples, the vortex generator may include a spatial light modulator. The spatial light modulator may be used with an azimuthal polarizer, to produce the toroid-shaped scan spot. For example, a beam may be directed through a polarizer to produce both radial and azimuthal polarizations, and the radial component may be removed with the spatial light modulator (spatial filter) to leave the azimuthal polarized light, which is focused using a lens system to form the toroid-shaped scan spot. A spatial light modulator (SLM) typically has a matrix of elements (e.g., 1000×1000), each of which can be selectively turned on and off. In some examples, linear polarized light is directed onto an SLM and a specific mask (set of matrix elements programmed as on/off) are inputted. The light can be reflected or transmitted through the SLM. After interacting with the SLM, the light is circularly polarized and then incident on the sample, forming the toroid-shaped scan spot. When images are subtracted, the diameter of this dark area can define the improved lateral resolution. Thus, in C-SIM microscopy and related difference microscopy techniques, two images are acquired by scanning two different tightly focused scan spots and the images are subtracted from each other to improve the lateral resolution of the system.

To generate a C-SIM image, the microscopy system needs to acquire perfectly aligned non-toroidal image and toroidal image of the same imaging area. Applicant recognizes that since the illumination beam needs to be switched between the Gaussian beam and the vortex beam, care needs to be given to ensure that the switching of the illumination beam does not affect the position of the corresponding beam spot on the sample plane. As the super-resolution images captured using C-SIM microscopy are on a scale of micrometers to nanometers, it is important that the optical system involved in the capturing of the super-resolution images experiences minimal movement. Any change in the optical system may result in errors within the super-resolution images, including undesired blurring and noise. Particularly, movement of the vortex generator may result in inaccurate imaging. Regular movement of optics, combined with temperature change, may also induce drift within the optical system, compromising the accuracy and reliability of measurements.

In order to address the above issues, an optical system is used for generating the structured illumination. The optical system includes a first set of optical components fixedly aligned relative to a light beam entering the optical system and a second set of optical components adjustable between a first operating position and a second operating position. The second set of optical components may be moved to the first operating position to generate a first output beam and the second operating position to generate a second output beam. At the first operating position, the input light beam is expanded, and the expanded beam (i.e., the first output beam) is used for acquiring a first image (such as the non-toroidal image or confocal image). At the second operating position, the input light beam passes through the second set of optical components and forms a vortex beam. The vortex beam may be outputted as a second output beam. The vortex beam is used for acquiring the second image (such as the toroidal image). By fixedly aligning the first set of optical components relative to the input light beam, the first set of optical components, that is, the optical components for generating the vortex beam, is not moved when the output beam is switched between expanded beam and the vortex beam. As such, by keeping the highly sensitive vortex generating optical components stationary with respect to the input light beam, stability of the output beam from the optical system for structured illumination is maintained, which ensures high quality super-resolution image generation.

The first set of optical components includes a vortex generator for forming the input light beam into a vortex beam. The vortex generator may include a VPP, an azimuthal polarizer, or a spatial light modulator (SLM). In one example, the vortex generator includes a VPP. The vortex generator may optionally include a quarter waveplate. In another example, the vortex generator includes a SLM. In yet another example, the vortex generator includes a SLM and an azimuthal polarizer. All optical components of the first set of optical components may be aligned along a first optical axis.

The second set of optical components includes at least one beam expander. The beam expander may include multiple lenses positioned next to each other, or with other optical components among them.

In some embodiments, the input light beam passes through the first set of optical components when the second set of optical components are in either the first operating position or the second operating position. The beam expander of the second set of optical components may be formed by two lenses. When the second set of optical components is in the first operating position, the input light beam sequentially passes through a first lens of the two lenses, the first set of optical components, and the second lens of the two lenses before being outputted as the first output beam. The vortex generator of the first set of optical components may be positioned near an intersection point between the first lens and the second lens. The focuses of the first and second lenses may substantially overlap at the intersection point. In one example, the first lens and the second lens may be separated by a distance between 10 inches and 14 inches, such as approximately 12 inches. The beam expander is configured so that the beam diameter of the light passing through the vortex generator is relatively small, and so that the input light beam may be expanded without being affected by the vortex generator. The beam diameter of light passing through the vortex generator may be dependent on the numerical aperture (NA) of the objective and the wavelength of the light. For example, with a high NA value (e.g., NA>1) for the objective and a wavelength of 532 nm, the beam diameter of light passing through the vortex generator may be less than approximately 20 mm. In some examples, the beam diameter of light passing through the vortex generator is less than 200 mm. When the second set of optical components is in the second operating position, the first and second lenses are moved away from the first optical axis of the first set of optical components, so that the input light beam does not pass through the first lens or the second lens. A vortex beam is generated by passing the input light beam through the vortex generator of the first set of optical components. The vortex beam is outputted as the second output beam.

In some embodiment, the input light beam bypasses the first set of optical components when the second set of optical components is in the first operating position. The second set of optical components may include a mirror that deflect the input light beam away from the first optical axis of the second set optical components in the first operating position. The deflected beam then passes through a beam expander before outputting as the first output beam. In one example, the beam expander may be a part of the second set of optical components that is moved between the two operating positions. In another example, the beam expander may be fixedly mounted relative to the first second of optical components, and is not moved between the operating positions.

The first set optical components may include a beam splitter for directing a portion of the light beam passing through the first set optical components to a second detector (such as a polarimeter) for monitoring the polarization status of the vortex beam. The beam splitter may be used during the calibration process and removed during sample measurement.

In some aspects, the input light beam has a wavelength between approximately 200 nanometers and 900 nanometers. For example, the light may have a wavelength of approximately 532 nanometers.

In some aspects, the second set of optical components are situated on a mechanical slider configured to move the second set of optical components between the first operating position and the second operating position. In some aspects, the system includes a controller configured to control the mechanical slider to adjust the second set of optical components between the first operating position and the second operating position. In some examples, the optical system for structured illumination is used in a microscopy system. The microscopy system comprises a light source configured to generate a light beam; an optical system for receiving the light beam and generate the first output beam or the second output beam; at least one actuator to adjust the second set of optical components between the first operating position and the second operating position; an objective to direct either the first output beam or the second output beam to a sample; a detector for receiving light from the sample; and a controller including a processor and a non-transitory memory for storing computer readable instructions, when the computer readable instructions are executed by the processor, the microscopy system is configured to: adjust, via the actuator, the second set of optical components in the first operating position; direct the first output beam towards the sample and generate a first image based on light received from the detector; adjust, via the actuator, the second set of optical components in the second operating position; direct the second output beam towards the sample and generate a second image based on light received from the detector; and generate a C-SIM image based on first image and the second image.

The first and second outputs beam may be directed to the sample surface via a microscope including a scanner and at least an objective. The scanner scans the beam over a sample region. The objective focuses the beam at a sample plane. The first and second output beams are aligned when entering the microscope.

The first and second images may be acquired by scanning the first output beam and the second output beam over the sample region, respectively. The first image is a non-toroidal image and the second image is a toroidal image. The microscopy system may include a pinhole for confocal imaging. As such, the non-toroidal image may be a confocal image. The pinhole may be effectively formed by an optical fiber. In one example, the first image is acquired before acquiring the second image. In another example, the image is acquired after acquiring the second image.

FIGS. 1A-1D illustrate an example C-SIM imaging process 100 with simulated data. FIG. 1A is the ground truth shape of a set of point source objects 102_a_, 102_b_ arranged to be imaged with a structured illumination microscopy system. As shown, the objects 102_a_, 102_b_ are simulated spots of fluorescein-dyed nanoscale beads. FIG. 1B is the simulated confocal image (or non-toroidal image) of the objects 102_a_, 102_b_ convolved with a focused Gaussian beam. Because of the diffraction limit, the image appears as a skewed blob 104 omitting the spaced-apart, dual nature of the objects 102_a_, 102_b_. FIG. 1B is representative of an image obtained with a typical confocal microscope. FIG. 1C is a simulated vortex image obtained by convolving the objects 102_a_, 102_b_ with a focused toroidal beam. The diameter of the focused toroidal beam (including both light and dark areas) is typically larger than the diameter of the focused Gaussian (or non-toroidal) beam. Holes 106_a_, 106_b_ become visible to form a somewhat similar skewed blob 108, shown in the image of FIG. 1C.

Figure 1D:
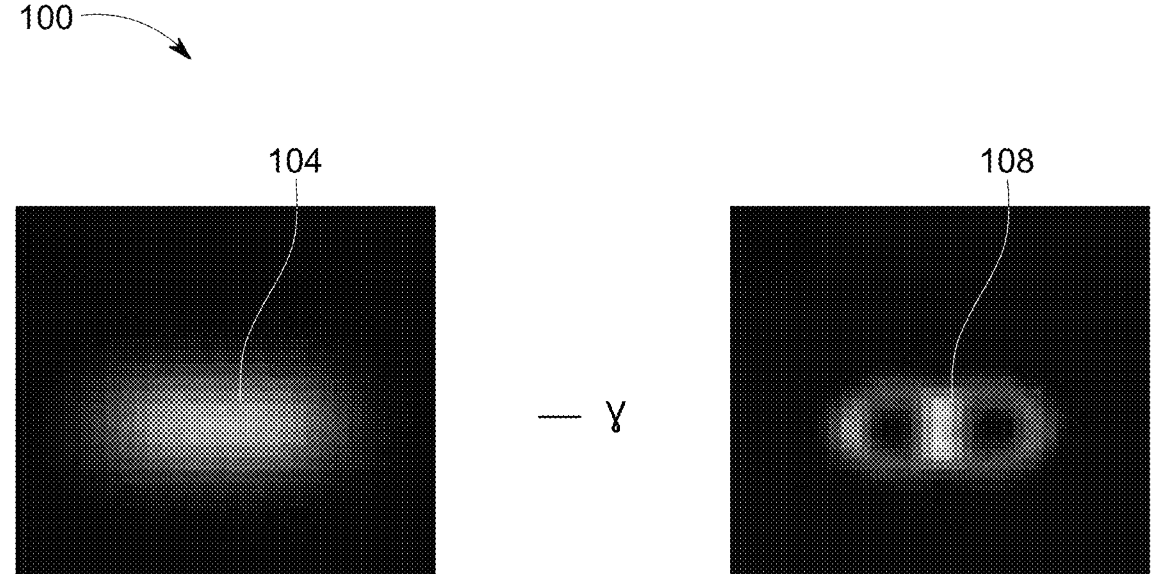
Figure 1D:
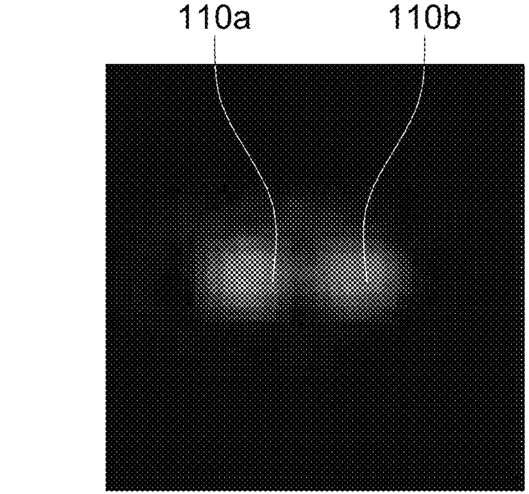

FIG. 1D shows the pixel intensities of the toroidal image being weighted and subtracted from the pixel intensities of the confocal image to form a subtracted, or difference, image (that is, the C-SIM image). In the subtraction image, separated blobs 110_a_, 110_b_ are seen that have more characteristics in common with the actual objects 102_a_, 102_b_, demonstrating the improved lateral resolution available for the microscope used to collect the images. By using the subtraction technique, the improved lateral resolution can distinguish the simulated spots 102_a_, 102_b_ that would otherwise not be distinguishable.

As shown, the intensities of the toroidal image are weighted by a gamma factor. Thus, with one image ($I_{non\text{-}toroidal}$) acquired using a confocal scan spot and the other image ($I_{toroidal}$) acquired using a toroidal-shaped scan spot, and with the image acquired with the toroidal-shaped scan spot being typically scaled by and an arbitrary parameter before being subtracted from the Gaussian image to generate the C-SIM image ($I_{C\text{-}SIM}$), the equation for determining the intensities of the super-resolution image can be generally of the form:

$$I_{C\text{-}SIM} = I_{non\text{-}toroidal} - (\text{Gamma}) * I_{toroidal}$$

where gamma is the arbitrary parameter. The arbitrary parameter may be determined based on a peak of the non-toroidal beam imaging pixel intensity and a peak of the toroidal beam imaging intensity across the imaging area, as disclosed in U.S. application Ser. No. 18/296,859, titled "Adaptive subtraction for C-SIM Microscopy," the entirety of which is hereby incorporated by reference.

Figure 2A:
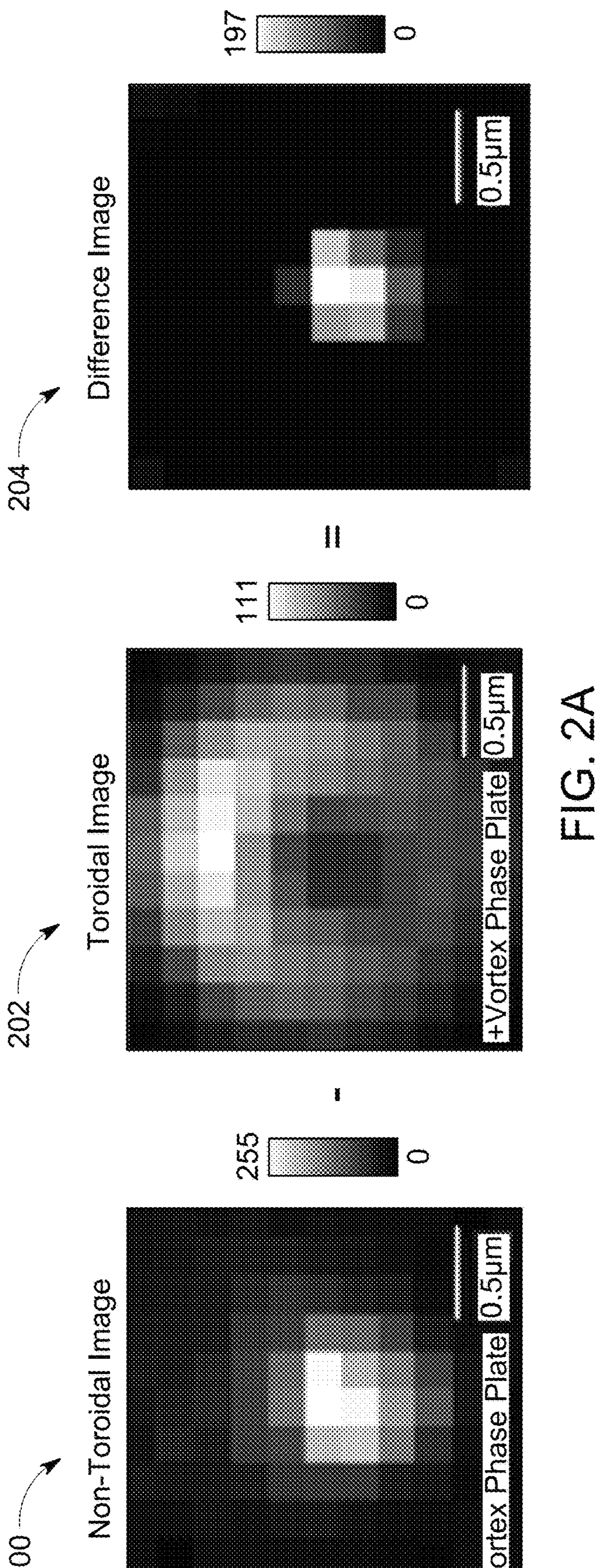
FIG. 2A is further images depicting a subtraction microscopy process.
Figure 2B:
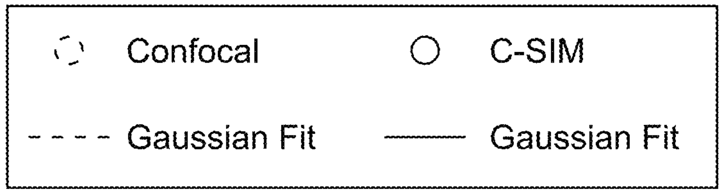
FIG. 2B is a graph providing the cross-section of the images of FIG. 2A.
Figure 2B:
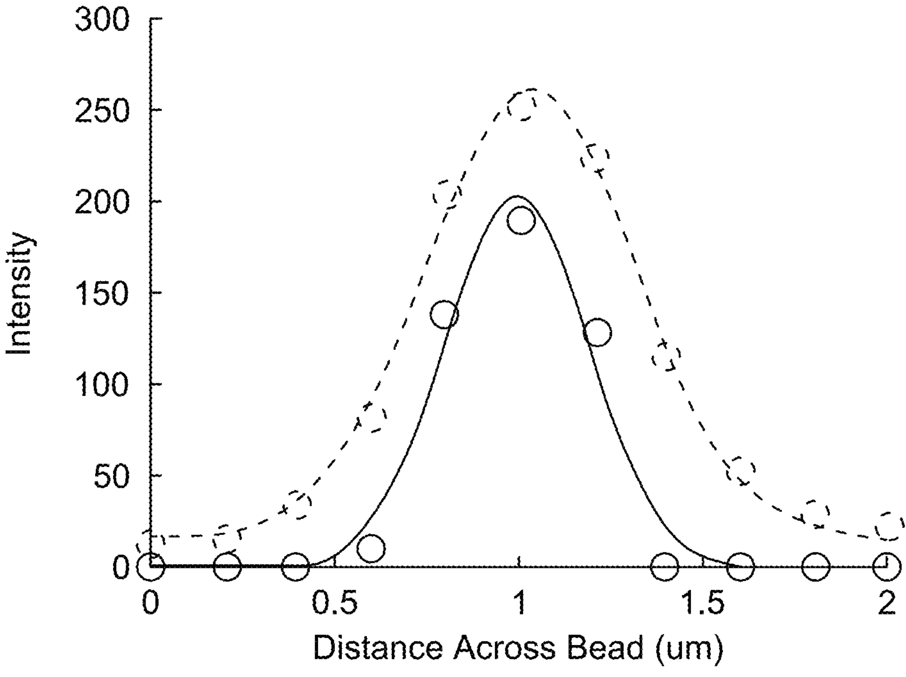

FIGS. 2A-2B illustrate another example C-SIM process with experimental data. A set of sub-resolution fluorescence beads dried on a cover glass were imaged. The width of the beam was approximately 0.5 um. FIG. 2A shows the non-toroidal image 200, the toroidal image 202, and the C-SIM image 204 acquired from the same bead. The resulting C-SIM image 204 was produced by the subtraction of the toroidal image 202 from the non-toroidal-image 200. FIG. 2B compares the signal intensity at the same cross-section of the bead in the non-toroidal (confocal) image 200 and the C-SIM image. The width of the bead captured in the confocal image is 0.73 μm, and the width of the bead captured within the C-SIM image 204 is 0.45 μm, wherein the beam width is estimated based on the full-width-at-half max of the Gaussian fitted intensity profile.

Figure 3:
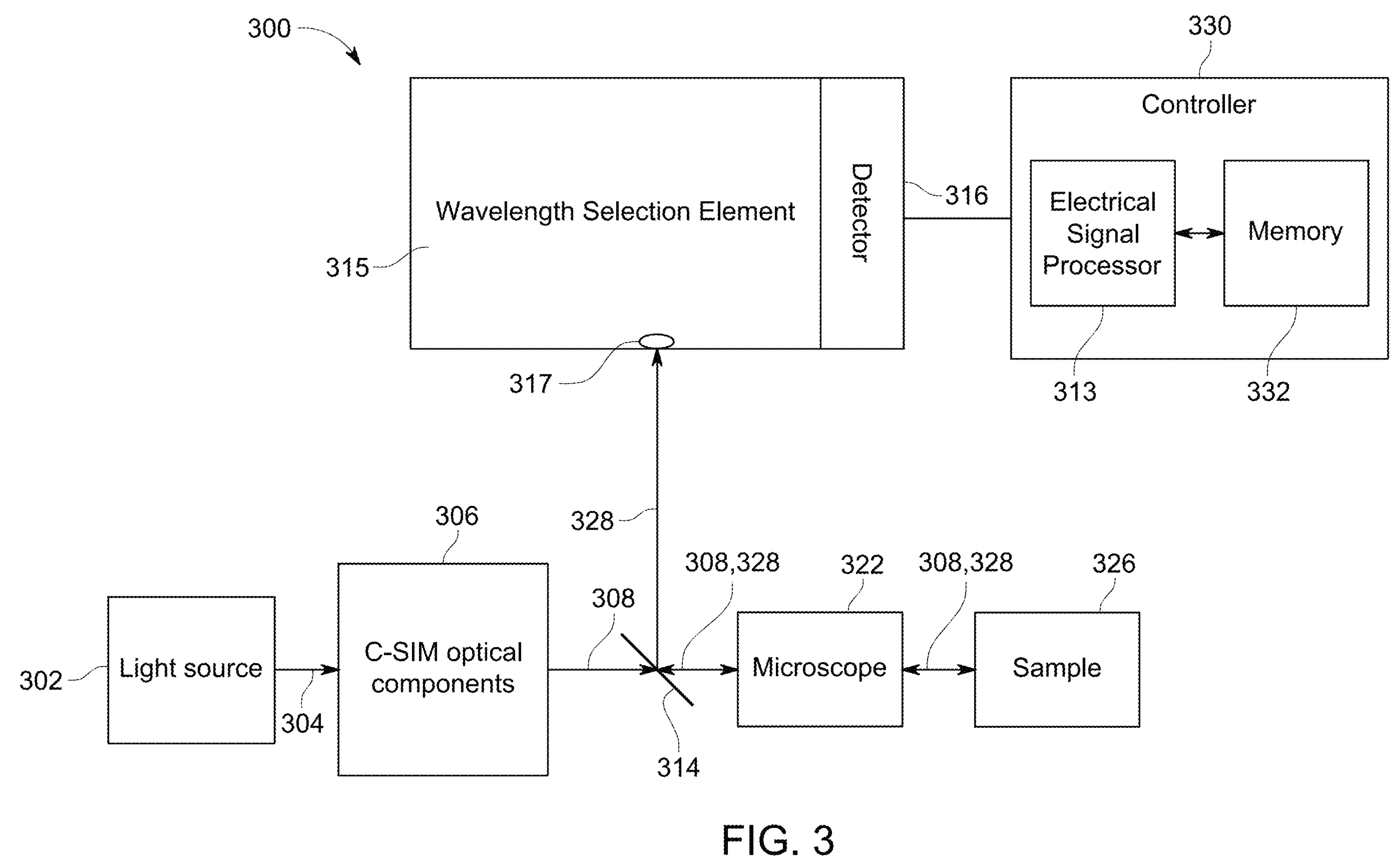
FIG. 3 schematically illustrates an example microscopy system.

FIG. 3 illustrates a block diagram of an example microscopy system 300. The microscopy system 300 includes a light source 302 that emits a light beam 304 and C-SIM optical components 306 that receive the light beam 304 from the light source 302. The C-SIM optical components 306 receives the light beam 304 and outputs an output beam 308. The output beam 308 is received by a dichroic filter 314 (or, in some implementations, a dichroic mirror).

The output beam 308 transmits through the dichroic filter 314 and enters a microscope 322. The microscope 322 includes at least a scanner and an objective. The microscope 322 directs and focuses the output beam 308 towards a sample 326. The scanner may scan the output beam 308 over a sample region of the sample 326. The microscope 322 receives sample light 328 from sample 326 and transmits the sample light 328 to a wavelength selection element 315 via the dichroic filter 314. The wavelength selection element 315 may receive the sample light 328 via an input port 317, such as a pinhole. The wavelength selection element 315 selectively transmits a wavelength range of sample light 328 to the detector 316. The wavelength selection element may include one or more of a filter, a monochromator, and a spectrometer. The detector 316 may be, for example, a camera integrated within a spectrograph or connected to a spectrograph. The electrical signal is transmitted from the detector to a controller 330 that includes an electronic processor 313 and a memory 332. The controller 330 (i.e., through execution of software stored in the memory 332 with the electronic processor 313) performs analysis of the light detected from the sample (such as the sample light 328) based on the electrical signal from the detector 316.

The microscopy system 300 may be a structured illumination microscopy system, wherein the output beam 308 from the C-SIM optical components 306 may be either the non-toroidal beam or the toroidal beam. The non-toroidal and the toroidal beams are aligned. The input port 317 may be a confocal pinhole. The signal detected from the detector may include both fluorescence and Raman signals. Optical fibers may be used in any of the light path shown in FIG. 3 as an optical wave guide. For example, sample light 328 reflected from the dichroic filter 314 may be coupled into one end of an optical fiber, and the other end of the optical fiber may be coupled with the wavelength selection element 315. The end of fiber that receives light from the dichroic filter 314 may function as the input port 317.

The controller 330 may have additional or fewer components than those illustrated. The controller 330 is suitable for the application and setting, and can include, for example, multiple electronic processors, multiple data storage devices (memory modules), or combinations thereof.

The memory 332 may include one or more local or remote memory device such as random-access memory (RAM) devices (e.g., static RAM (SRAM) devices, magnetic RAM (MRAM) devices, dynamic RAM (DRAM) devices, resistive RAM (RRAM) devices, or conductive-bridging RAM (CBRAM) devices), hard drive-based memory devices, solid-state memory devices, networked drives, cloud drives, or any combination of memory devices.

In some implementations, the microscopy system 300 includes more or fewer optical components than illustrated in FIG. 3. For example, additional mirrors may be provided to direct the light beams.

Figures 4A, 4B:
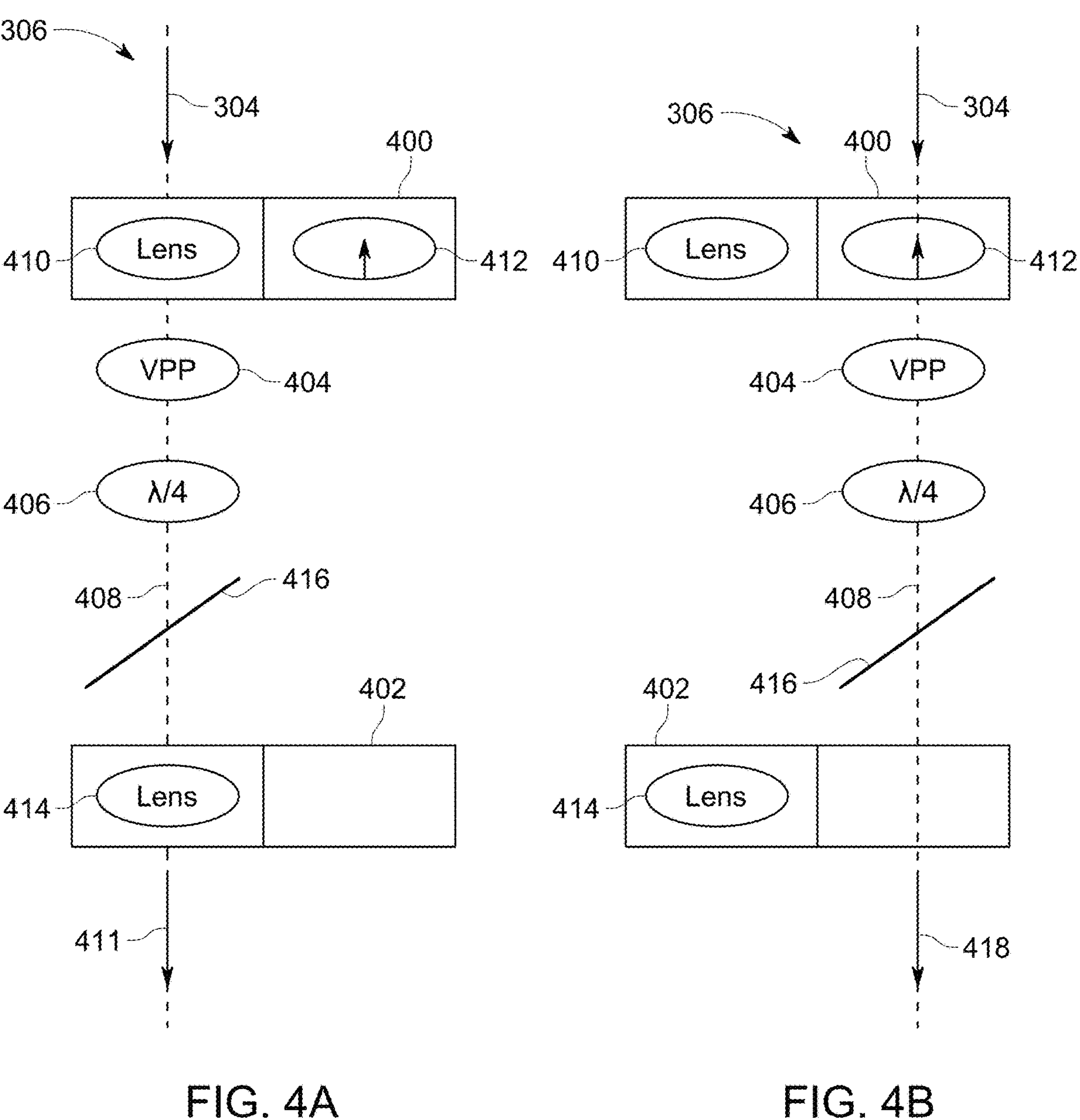
FIGS. 4A and 4B schematically illustrates example C-SIM optical components included in the microscopy system of FIG. 3 according to one embodiment.

FIGS. 4A-4B illustrate one example of the C-SIM optical components 306 in different operating positions. The C-SIM optical components 306 include a first slider 400 and a second slider 402. A VPP 404 and a quarter wave plate 406 are situated between the first slider 400 and the second slider 402. The VPP 404 and the quarter wave plate 406 are situated along an optical path 408 and form, for example, a first set of optical components. The light beam 304 from the light source 302 travels along the first optical path 408.

The first slider 400 includes a first lens 410 and a linear polarizer 412 that form, for example, a second set of optical components. The second slider 402 includes a second lens 414. The first slider 400 and the second slider 402 move to place the first lens 410 and the second lens 414 or place the linear polarizer 412 within the optical path 408 such that the light beam 304 travels through either the first lens 410 and the second lens 414 or through the linear polarizer 412. The linear polarizer 412 includes optics that convert incident light to a completely linear polarized state.

In FIG. 4A, the second set of optical components of the C-SIM optical components 306 are in a first operating position. Particularly, in the first operating position, the light beam 304 input to the C-SIM optical components 306 is expanded and is output as the first output beam 411 (which may be, for example, the output beam 308 of FIG. 3) to the microscope 322 as a non-toroidal-shaped beam. In the first operating position, the first slider 400 and the second slider 402 are positioned such that the first lens 410 and the second lens 414 are aligned along the optical path 408. The light beam 304 from the light source 302 (shown in FIG. 3) travels along the first optical path 408, sequentially through the first lens 410, the VPP 404, the quarter wave plate 406, and the second lens 414.

Figure 5:
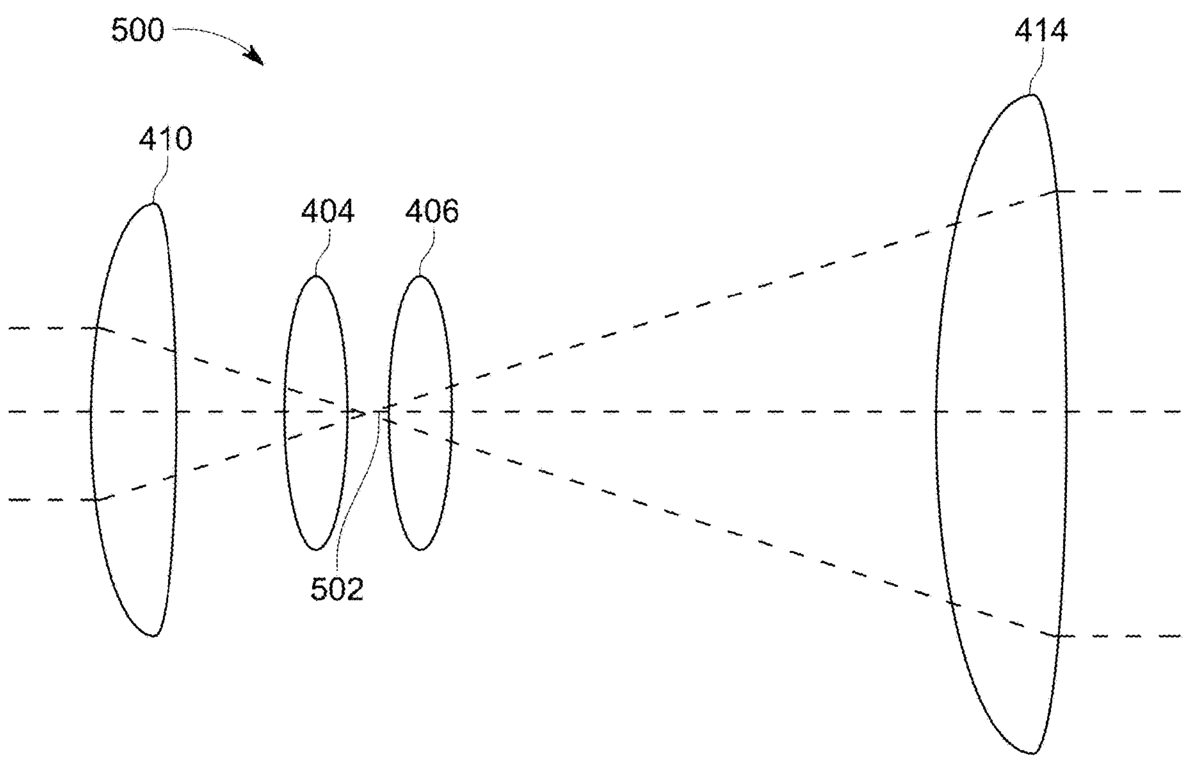
FIG. 5 is an example beam expander implemented with the C-SIM optical components of FIG. 4A.

The first lens 410 and the second lens 414, when considered together, form a beam expander 500, as shown in FIG. 5. The dashed lines are ray tracing of light passing through the beam expander. The beam expander 500 may be, for example, a Keplerian beam expander providing approximately 1×, 2×, or 3× beam expansion to the light beam 304. In the example of FIG. 5, the first lens 410 and the second lens 414 have a relatively long focal length such that the distance between the first lens 410 and the second lens 414 is between approximately ten inches to fourteen inches. In other implementations, the distance between the first lens 410 and the second lens 414 may be greater than ten inches. Due to this long focal length, the light passing through the space between the first lens 410 and the second lens 414 occupies a narrow space in the central area between the first lens 410 and the second lens 414. The vortex generator, in this example the VPP 404 and the quarter wave plate 406, is situated at a narrow space on opposing sides of an intersection point 502 such that, the beam diameter passing through the vortex generator is small, so that the light beam 304 experiences minimal perturbation from the vortex generator. The intersection point 502 is the intersection of the foci of the first lens 410 and the second lens 414. The expanded beam is provided as the output beam 308 and fills a back lens of the objective of the microscope 322.

In FIG. 4B, the second set of optical components of the C-SIM optical components 306 are in a second operation position and a vortex (toroidal-shaped) beam is formed. In the second operating position, the first slider 400 and the second slider 402 are positioned such that the first lens 410 and the second lens 414 are removed from the optical path 408 and the linear polarizer 412 is aligned along the optical path 408. The light beam 304 is not expanded but instead is transformed to a vortex beam (second output beam) 418 by the VPP 404 and the quarter wave plate 406. The second output beam 418 is provided as the output beam 308 and is transmitted to the microscope 322 (as shown in FIG. 3).

The first slider 400 and the second slider 402 are mechanical sliding components that transition the second set of optical components between the first operating position and the second operating position. The first set of optical components, that includes the VPP 404 and the quarter wave plate 406, are fixedly aligned with the input light beam 304. The first set of optical components may be secured to a base plate (shown in FIG. 6) and do not move off the optical path 408. Movement of the first slider 400 and the second slider 402 may be caused by an operator of the microscopy system 300 or may be controlled by a controller (e.g., the controller 330) associated with the microscopy system 300.

In some implementations, the C-SIM optical components 306 include a beam splitter 416 situated between the quarter wave plate 406 and the second slider 402. The beam splitter 416 may split a small portion of the light beam 304 (for example, 10% of the light beam 304) to a separate measurement device, such as a polarimeter 604 (shown in FIG. 6).

Figure 6:
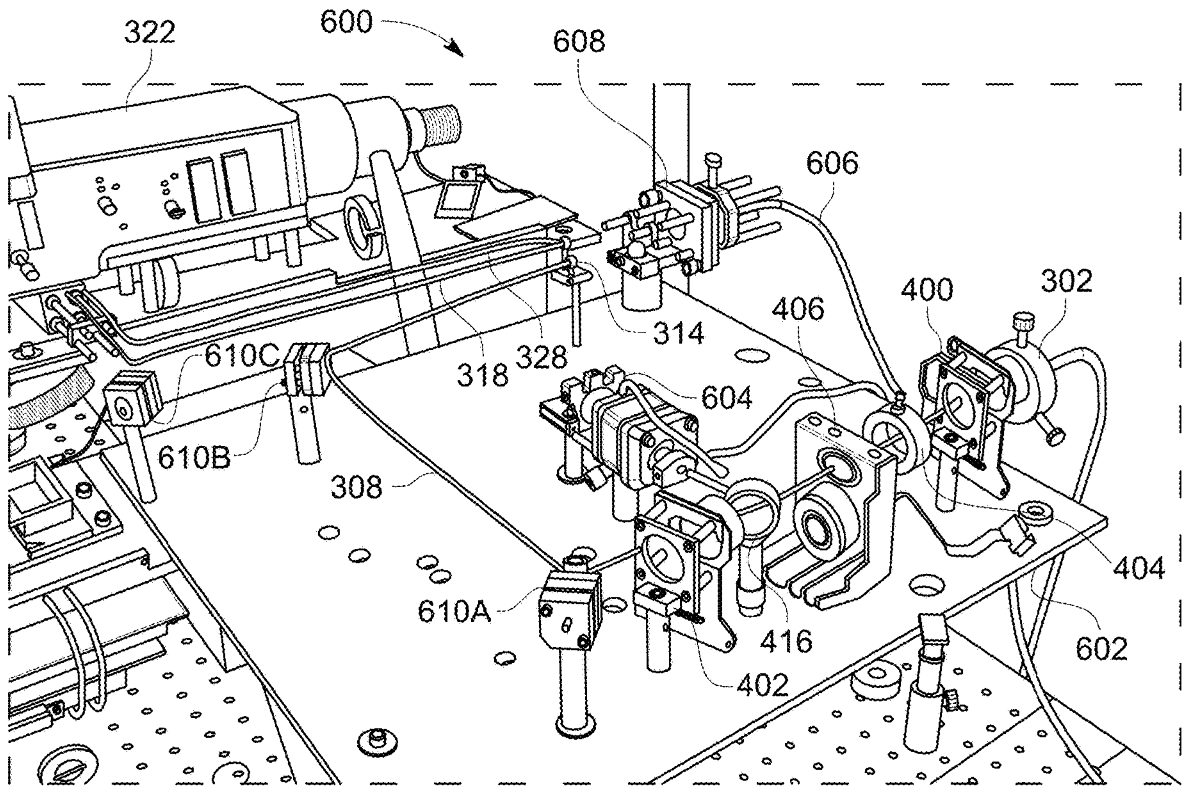
FIG. 6 illustrates another example microscopy system.

FIG. 6 illustrates an example microscopy system 600 with C-SIM optical components 306 of similar configuration of FIGS. 4A and 4B. The microscopy system 600 may be substantially similar to the microscopy system 300, shown in more detail. In the example of FIG. 6, the VPP 404 and the quarter wave plate 406, along with other optical components, are fixedly secured to a base plate 602. Additionally, the microscopy system 600 includes a polarimeter 604 that receives a portion of light from beam splitter 416. In the microscopy system 600, focusing optics 608 are situated optically after the dichroic filter 314. The focusing optics 608 focus sample light 328 onto a fiber optic cable 606 connected to a spectrometer (such as the spectrometer 312). The example microscopy system 600 may also include a plurality of mirrors 610 for directing light traveling within the microscopy system 600. For example, a first mirror 610A and a second mirror 610B direct the output beam 308 from the second slider 402 to the dichroic filter 314. A third mirror 610 directs the third light 318 from the dichroic filter 314 to the microscope 322 and directs scattered light 328 from the microscope 322 to the dichroic filter 314.

Figure 7A:
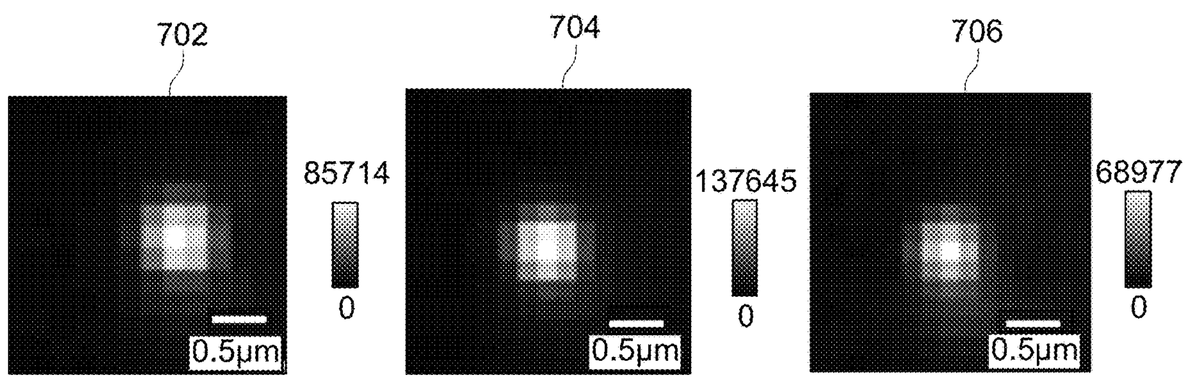
FIG. 7A includes confocal images captured by the microscopy system of FIG. 3.
Figure 7B:
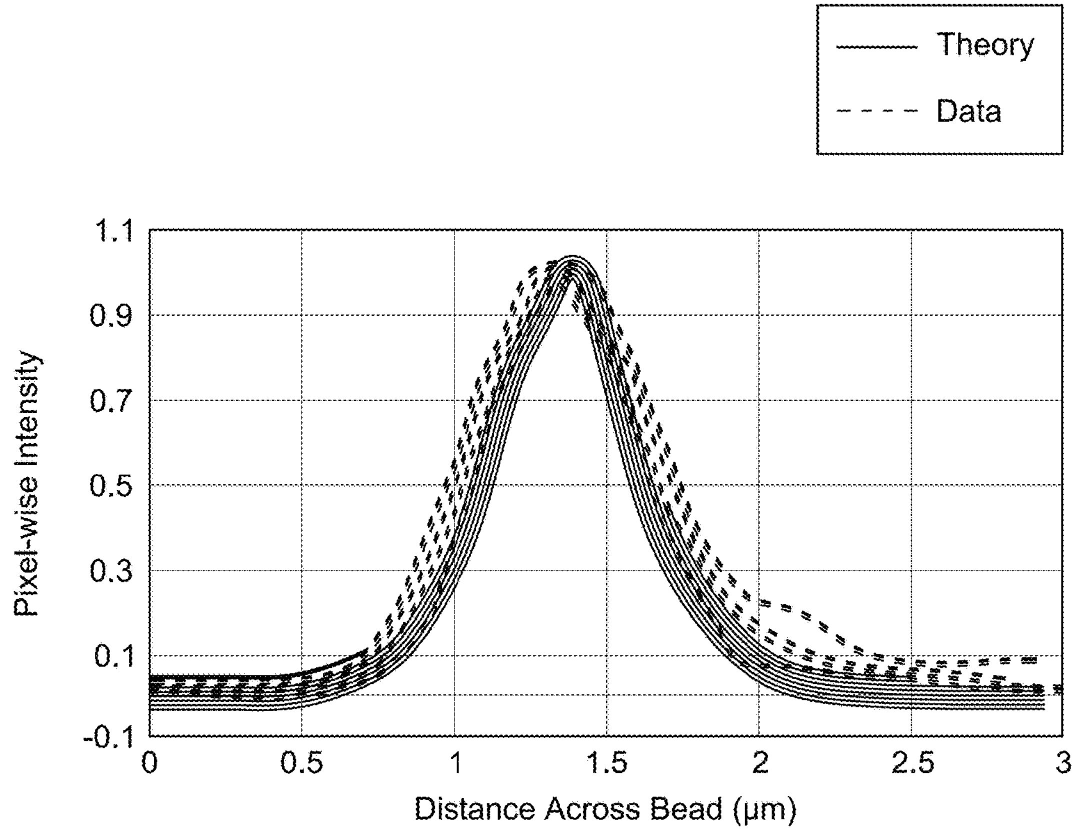
FIG. 7B is a graph providing the cross-section of the images of FIG. 7A.

FIG. 7A illustrates a first C-SIM image 702, a second C-SIM image 704, and a third C-SIM image 706 of imaged 0.5 μm fluorescent beads. The C-SIM images 702-706 were captured using the microscopy system 300. The sizes of the imaged beads were measured using a full-width-at-half-max technique extracted from a line scan taken through the center of the bead. FIG. 7B illustrates a plot showing experimental (solid lines) and theoretical (dashed lines) signal intensities along the cross sections of the fluorescent beads within the C-SIM images plotted against the theoretical signal intensity. The measured signals are Gaussian-like, indicating an absence of obvious aberrations. Further, FWHM of the measured data was close to the theoretical signal intensity, which demonstrated the capability for the system for super-resolution imaging.

Figures 8A, 8B:
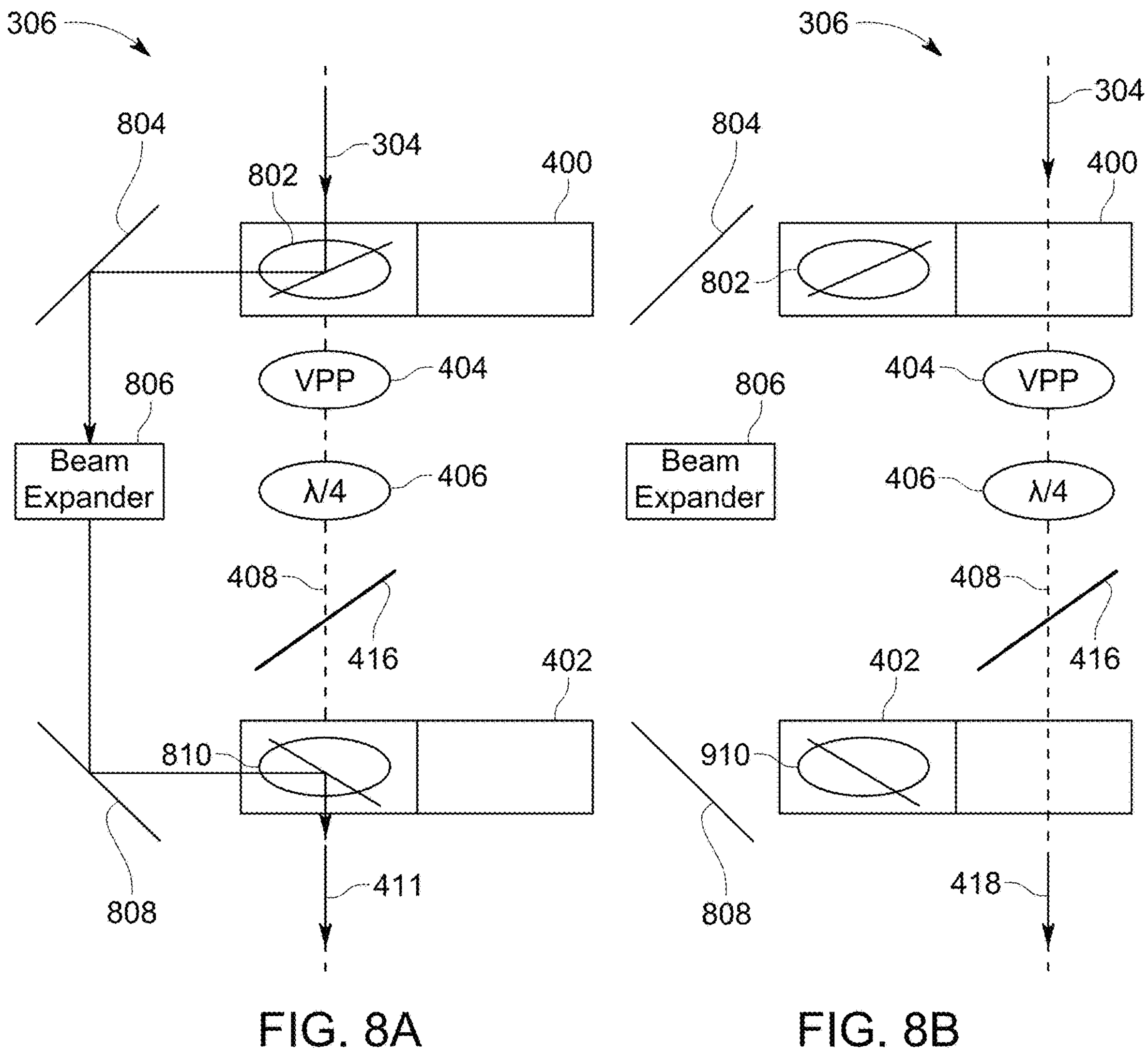
FIGS. 8A and 8B schematically illustrate example C-SIM optical components included in the microscopy system of FIG. 3 according to another embodiment.

FIGS. 8A-8B show another example embodiment of the C-SIM optical components 306. In this example, the first set of optical components include a vortex generator. The vortex generator includes a vortex phase plate 404 and a quarter waveplate 406. The first optical components may optionally include a beam splitter 416. The second set of optical components includes a beam expander 806. The beam expander 806 may be formed by two lenses, such as lenses 410 and 414 shown in FIGS. 4A and 4B. The second set of optical components may optionally include one or more mirrors (such as mirrors 802, 804, 808, and 810) for directing the input beam 304 through the beam expander, when the second set of optical components are at the first operating position. Some of the second set of optical components (such as mirrors 802 and 810) may be mounted on slider 400 and 402. Similar to the configuration of FIGS. 4A and 4B, sliders 400 and 402 may be individually or collectively driven by one or more actuators.

In FIG. 8A, the second set of the optical components of the C-SIM optical components 306 are in a first operating position. In the first operating position of FIG. 8A, the light beam 304 is diverted away from the optical path 408 and, therefore, bypass the vortex generator. The light beam 304 is diverted away from the VPP 404, the quarter wave plate 406, and the beam splitter 416, by a first mirror 802. The first slider 400 and the second slider 402 are positioned such that the first mirror 802 and a second mirror 810 are aligned along the optical path 408. The light beam 304 from the light source 302 (shown in FIG. 3) is directed by the first mirror 802 to a beam expander 806, which expands the beam to generate the expanded output beam 411, which is a non-toroidal-shaped beam. As illustrated in FIG. 8A, in some instances, the C-SIM optical components 306 also include a third mirror 804 to direct the light from the first mirror 802 toward the beam expander 806, and a fourth mirror 808 to direct the expanded output beam 411 from the beam expander 806 to the second mirror 810. The expanded output beam 411 is provided as the output beam 308 described above with respect to FIG. 3 and fills a back lens of the objective of the microscope 322.

In FIG. 8B, the second set of optical components of the C-SIM optical components 306 are in a second operation position. Particularly, in the second operating position, the C-SIM optical components 306 are configured to generate a vortex beam, such as a toroidal-shaped beam, such as a donut-shaped focused spot at the sample plane. In the second operating position, the first slider 400 and the second slider 402 are positioned such that the first mirror 802 and the second mirror 810 are removed from the optical path 408. Accordingly, in this position, the light beam 304 is not expanded but instead is transformed to a narrow vortex beam 418 by the VPP 404 and the quarter wave plate 406. The narrow vortex beam 418 is provided as the output beam 308 described above with respect to FIG. 3 and is transmitted to the microscope 322. The light beam may pass through the first and second sliders via apertures on the slider.

Figure 9:
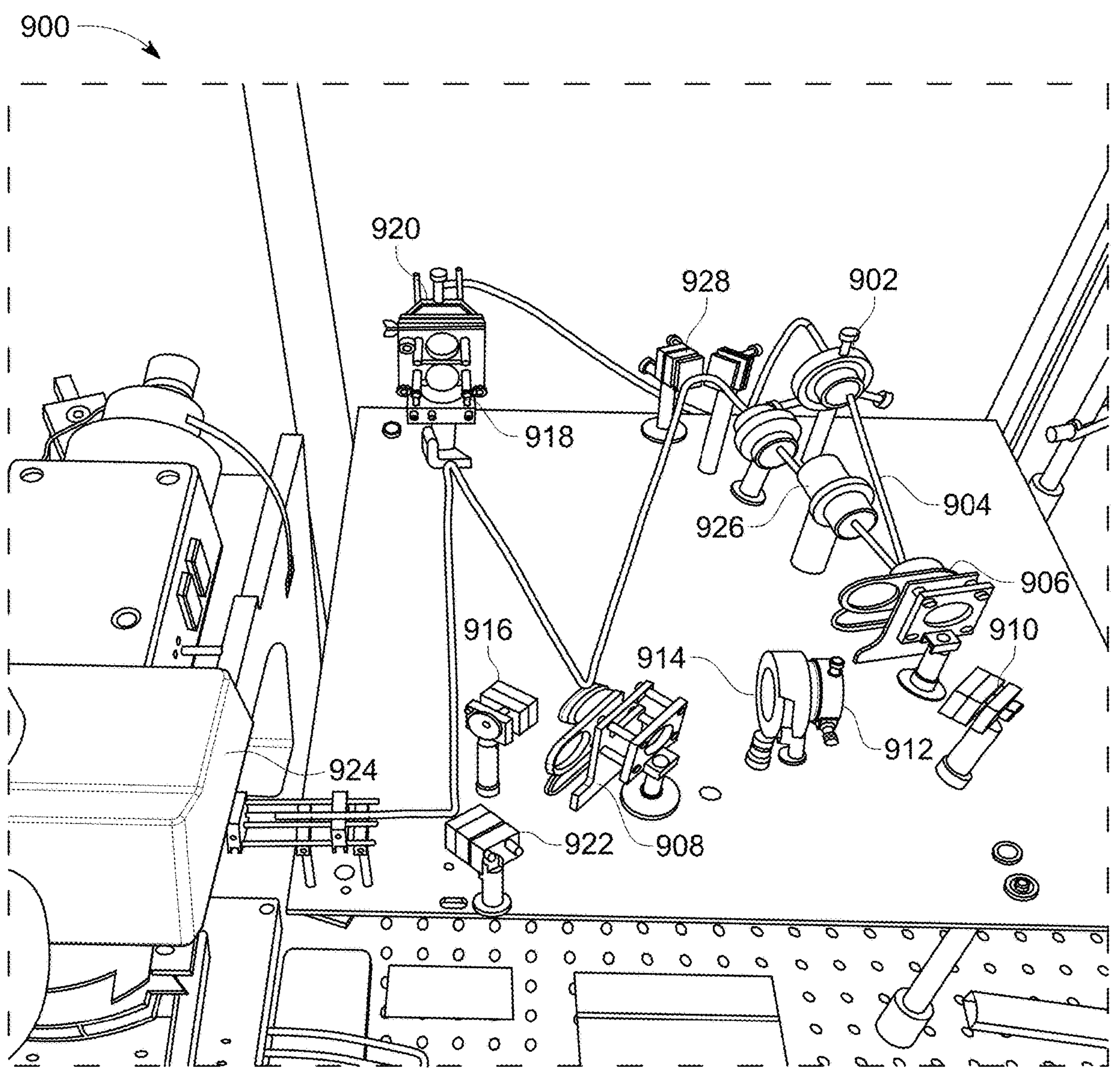
FIG. 9 and FIG. 10 illustrate example C-SIM optical components included in yet another microscopy system.
Figure 10:
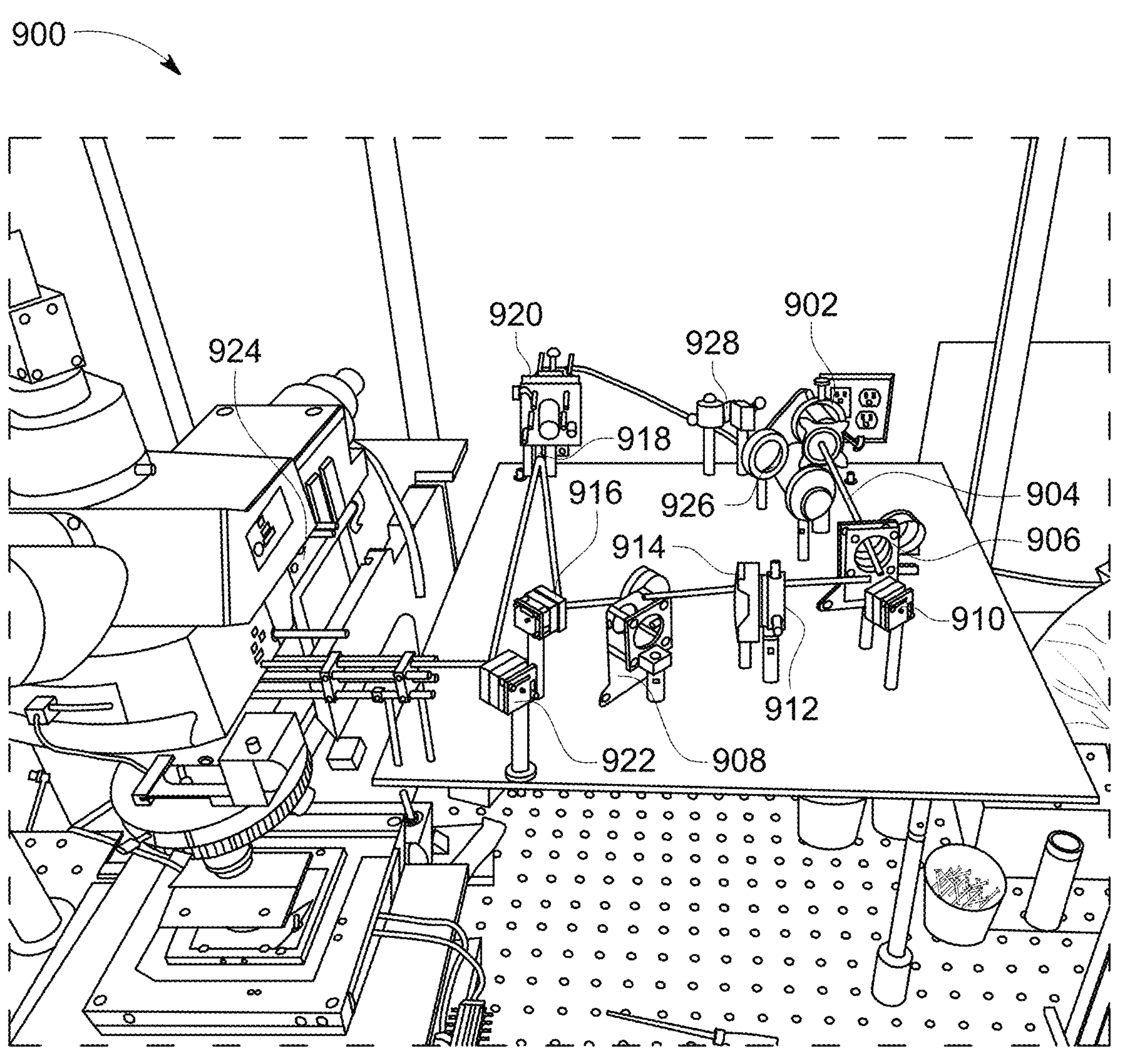

The microscopy system 300 and microscopy system 600 are merely examples, and further microscopy systems are possible that include a fixed or stationary vortex phase plate. For example, FIGS. 9-10 illustrate a microscopy system 900. In FIG. 9, the microscopy system 900 is in a first operating position. In FIG. 10, the microscopy system 900 is in a second operating position. Optical components found within the microscopy system 900 may operate similar to their counterparts in the microscopy system 300 but arranged in a different manner.

The microscopy system 900 includes a light source 902 configured to emit a light 904, such as a laser beam. The light 904 is emitted toward a first slider 906 that includes a transmissive portion, such as a hole, and a reflective portion, such as a mirror. In the first operating position, the reflective portion of the first slider 906 directs the light through a beam expander 926 (see FIG. 9). The light 904, after expansion, is reflected by steering mirrors 928 to a second slider 908. The second slider 908 also has a transmissive portion and a reflective portion. The reflective portion of the second slider 908 directs the light 904, after expansion, to a dichroic filter 918 and a detector 920. The light 904 is reflected by the dichroic filter 918 to a third mirror 922 and toward a microscope 924.

When the first slider 906 and the second slider 908 are moved from the first operating position to the second operating position, the optical path of the light 904 is altered. Particularly, as illustrated in FIG. 10, the empty portion of the first slider 906 is arranged along the optical path of the light 904, and the light 904 travels through the first slider 906 (bypassing the beam expanded 926). The light 904 travels through the first slider 906 and is reflected by a first mirror 910 and toward a VPP 912 and a quarter wave plate 914. The light 904 travels through the VPP 912 and the quarter wave plate 914 to a second slider 908. In the second operating position, the empty portion of the second slider 908 is arranged along the optical path of the light 904, and the light 904 travels through the second slider 908. The light 904 traveling through the second slider 908 is reflected by a second mirror 916 to the dichroic filter 918 and the detector 920. The light 904 is reflected by the dichroic filter 918 to the third mirror 922 and toward the microscope 924.

Accordingly, in the microscopy system 900, both the beam expander 926 and the VPP 912 are fixedly secured and do not need to be adjusted during measurements. Rather, additional mirrors are moved into or out of the optical path of the light 904 to direct the light along the appropriate pathway.

Figure 11:
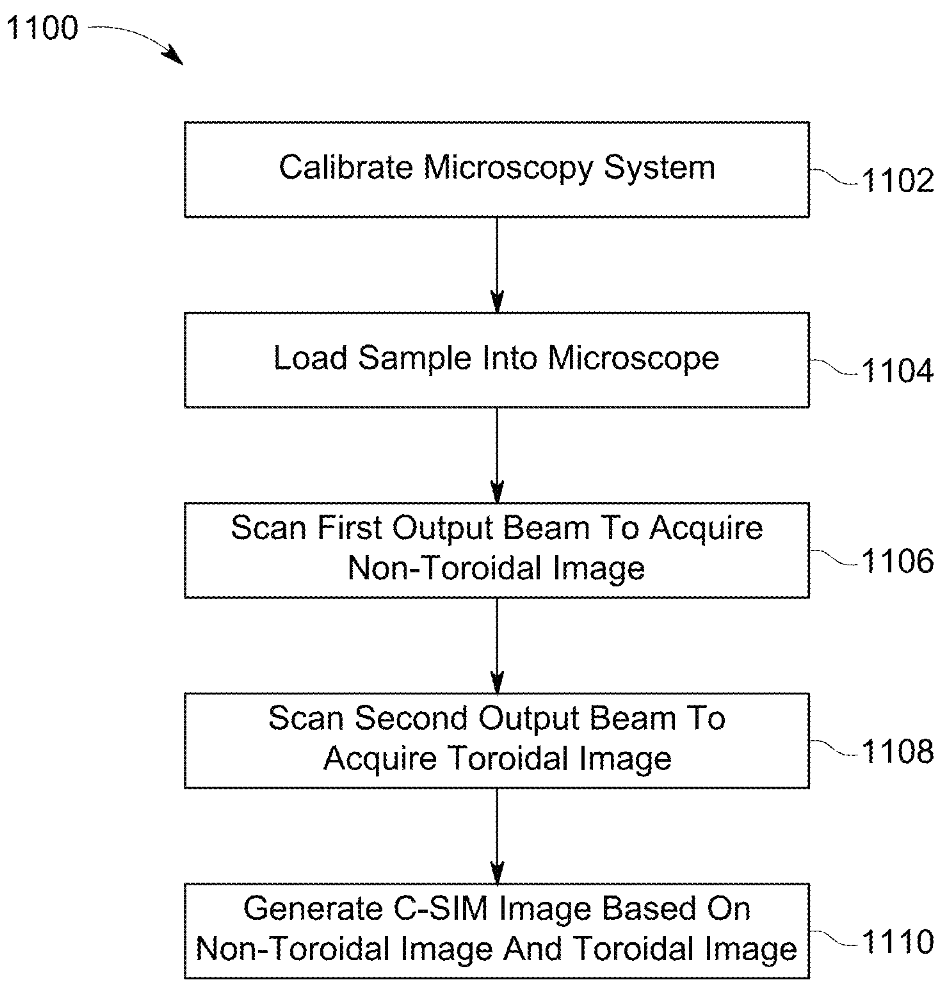
FIG. 11 is a flowchart illustrating an example method for generating a C-SIM image.
Figure 12A:
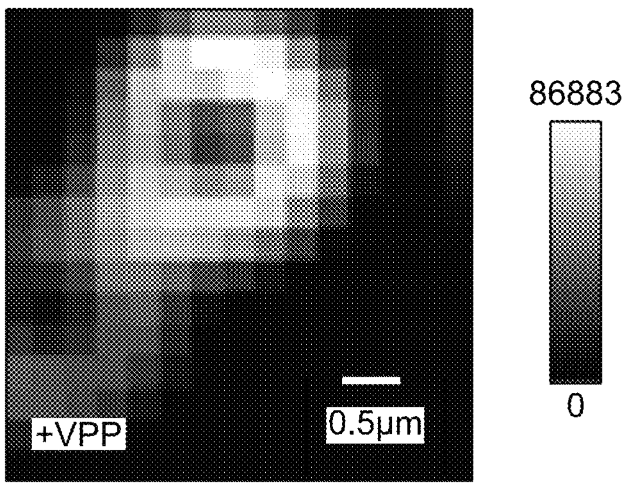
FIGS. 12A, 12B, 12C, and 12D are toroid-shaped images captured as part of the method of FIG. 11.
Figure 12B:
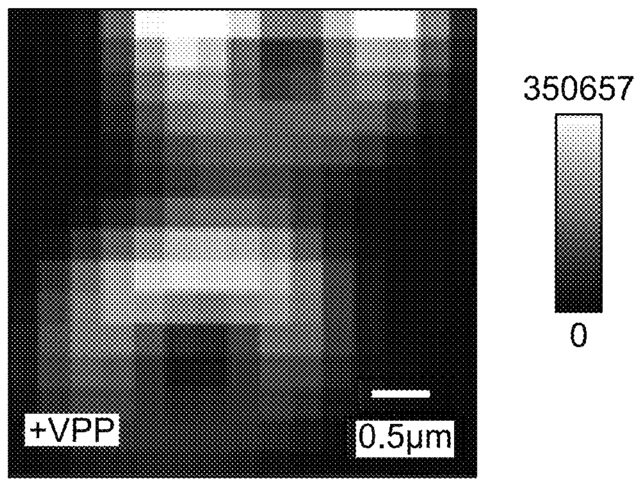
Figure 12C:
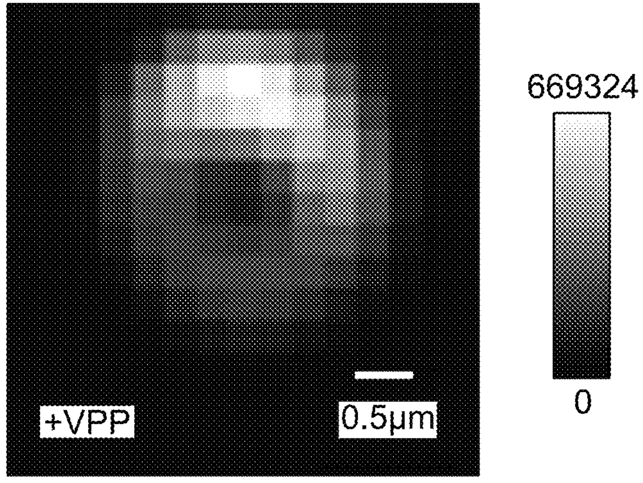
Figure 12D:
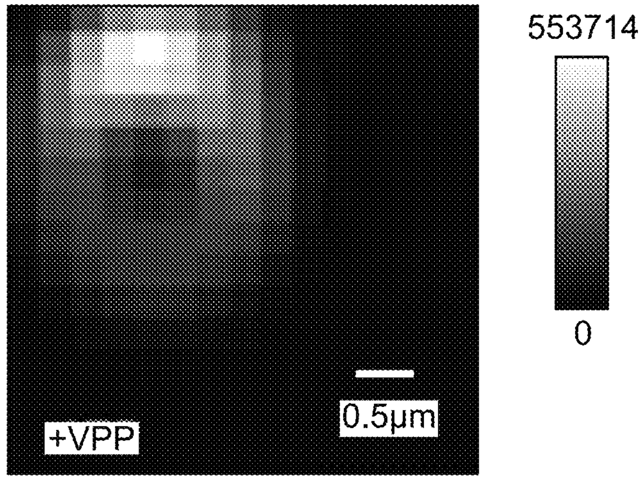

FIG. 11 is a flowchart illustrating an example method 1100 for generating a C-SIM image. The method 1100 may be performed by the controller 330 and may be performed using any of the example microscopy systems described herein. The steps of the method 1100 are described in an iterative manner for descriptive purposes. Various steps described herein with respect to the method 1100 are capable of being executed simultaneously, in parallel, or in an order that differs from the illustrated serial and iterative manner of execution. In some instances, various steps may be omitted from the method 1100.

At block 1102, the method 1100 includes calibrating the microscopy system 300. Calibrating the microscopy system may include aligning the first output beam and the second output beam generated respectively at the first and second operating positions of the second set of optical components. The microcopy system may be calibrated with a reference sample. For example, prior to measurement, toroidal images of 0.5 μm diameter fluorescent beads may be collected using the vortex phase plate 404 in the optical path. In other words, the toroidal images may be obtained with the C-SIM components 306 of the microscopy system in the second operating position. Examples of such images are shown in FIGS. 12A, 12B, 12C, and 12D. In each image, the donut-morphology is visible, and the uneven intensity in the intensities of the outer donut region is the result of photobleaching. These images can be used to ensure that the C-SIM optical components 306 are aligned prior to detailed imaging. In some instances, the operations of block 1102 are optional, and calibration may not be performed for every sample or before every scanning operation.

At block 1104, the method 1100 includes loading a sample into the microscope 322. As one non-limiting example, following the verification of alignment (block 1102), a sample of sulfur is loaded into the microscope 322.

Figure 13C:
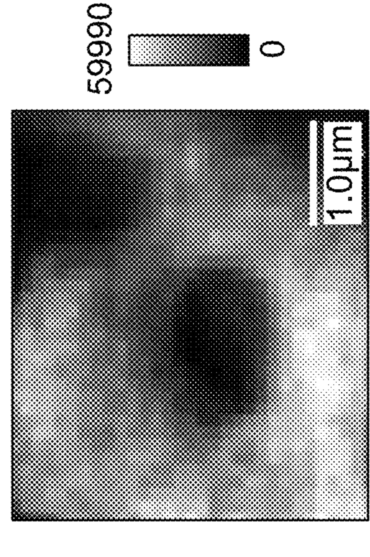
FIGS. 13A, 13B, and 13C are images depicting a subtraction microscopy process captured by the microscopy system of FIG. 3.
Figure 13B:
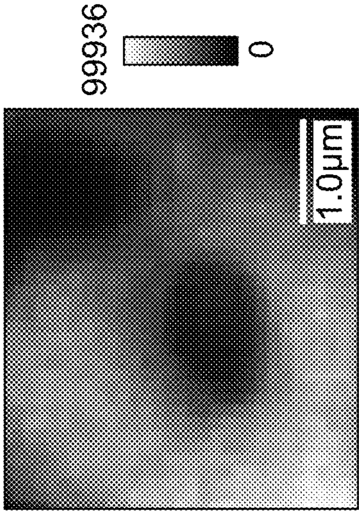
Figure 13A:
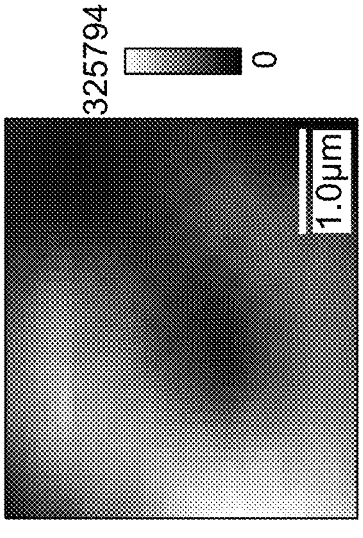

At block 1106, the method 1100 includes scanning a first output beam to acquire a non-toroidal image of the sample. For example, to acquire a non-toroidal image of the sample, the C-SIM optical components 306 are placed in the first operating position, such as shown in FIG. 4A, FIG. 8A, or FIG. 9. An example image of a sample (e.g., sulfur) acquired by scanning the non-toroidal shaped scan spot having a pixel size of 0.2 μm is shown in FIG. 13A.

At block 1108, the method 1100 includes scanning a second output beam to acquire a toroidal image of the sample. For example, to acquire a toroidal image of the sample, the C-SIM optical components 306 are placed in the second operating position, as shown in FIG. 4B, FIG. 8B, or FIG. 10. An example image of the sulfur sample acquired by scanning the toroidal-shaped scan spot having a pixel size of 0.2 μm is shown in FIG. 13B.

At block 1110, the method 1100 includes generating a C-SIM image based on the non-toroidal image (acquired at block 1106) and the toroidal image (acquired at block 1108). For example, the image in FIG. 13C represents a weighted subtraction of the images of FIGS. 13A and 13B and represents a super-resolution image. In the example of FIGS. 13A-13C, the toroidal image of FIG. 13B is subtracted from the non-toroidal image of FIG. 13A. The super-resolution image of FIG. 13C contains significantly more surface and edge detail compared to the images of FIGS. 13A and 13B. In FIG. 13C, an intricate set of intensity inhomogeneities are visible. In some examples, block 1108 is performed before block 1106. That is, the toroidal image is acquired before the non-toroidal image.

Figure 14A:
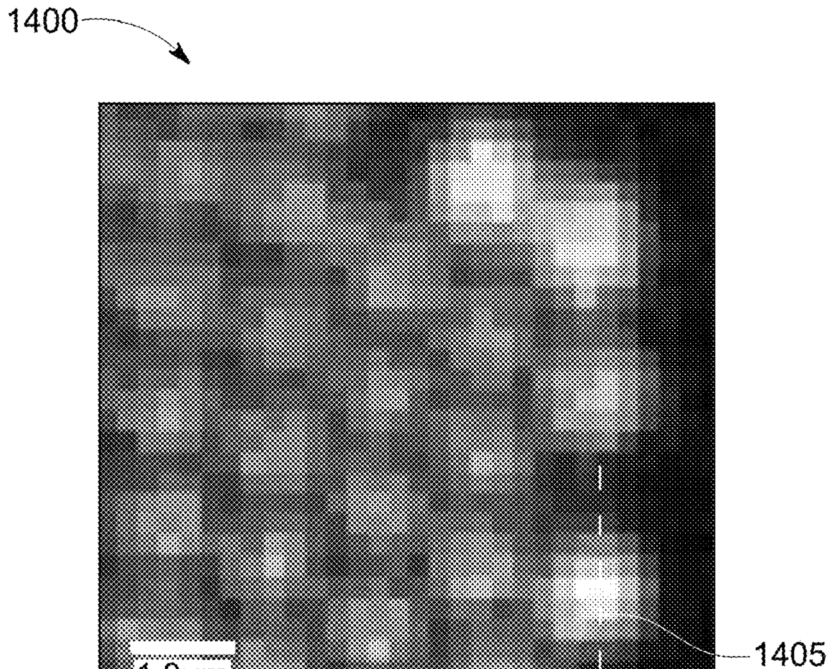
FIG. 14A is a confocal image of a matrix of beads captured by the microscopy system of FIG. 3.
Figure 14B:
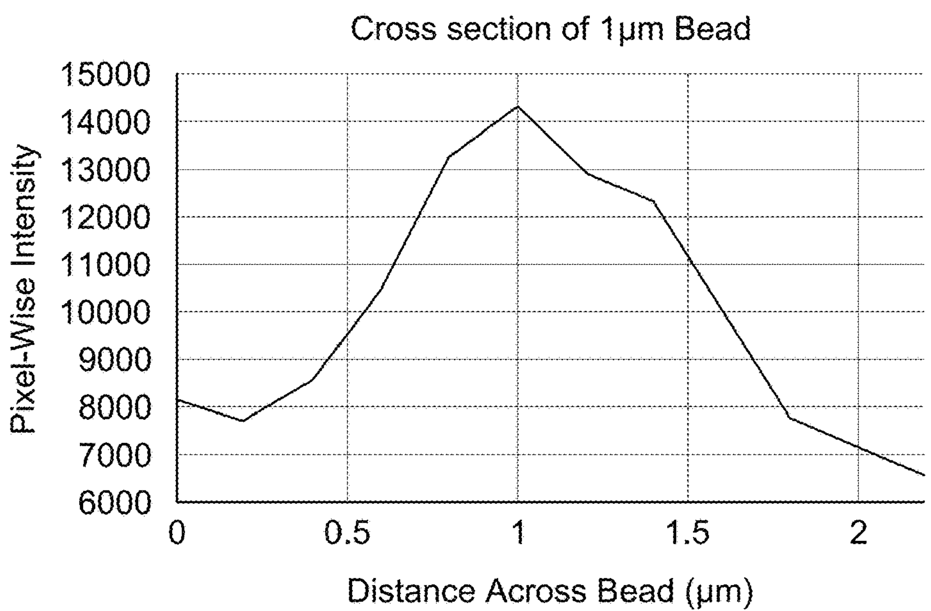
FIG. 14B is a graph providing the cross-section of a bead within the image of FIG. 14A.

FIG. 14A illustrates another example C-SIM image 1400 of matrices of 1.0 μm diameter polystyrene beads acquired via the methods and systems described herein. The polystyrene beads were dried on a cover glass and the image is collected with a 100×0.95NA objective. As shown in confocal image 1400, the beads were tightly packed together in a matrix-like form and were symmetric and regular in size. A line scan 1405 is taken across the center of one bead to capture its cross section, shown in FIG. 14B. The full-width-at-half-max of the bead is slightly over 1.0 μm. This width reflects not only the width of the bead itself, but also the convolution of the bead with the confocal scan spot, which increases the width of the bead as captured in images.

While examples described herein primarily refer to both a VPP and a quarter wave plate situated adjacently, in some instances, the quarter wave plate may be omitted such that light passes through a VPP and not a quarter wave plate while capturing images. Additionally, in some implementations, the VPP may be replaced by other optics that can produce vortex beams (for example, a spatial light modulator).

Additionally, while the sliders described herein with respect to microscopy system 300, microscopy system 600, and microscopy system 900 are illustrated and described as linear mechanical sliders that move laterally, other optical repositioning devices may also be implemented, such as rotary mechanical wheels or other manual or motorized positioning devices.

Accordingly, implementations described herein provide systems, methods, computing and storage devices, and computer-readable media for capturing C-SIM microscopy images with fixed optical components. As discussed above, the implementations described herein provide for adjusting between a confocal imaging mode and a toroidal imaging mode without adjusting a vortex phase plate. Implementations described herein improve the reliability and reproducibility of super-resolution imaging. Thus, implementations disclosed herein provide improvements to super-resolution imaging.

As described above in the detailed description, reference is made to the accompanying drawings that form a part hereof wherein like numerals designate like parts throughout, and in which is shown, by way of illustration, implementations that may be practiced. It is to be understood that other implementations may be utilized, and structured or logical changes may be made, without departing from the scope of the present disclosure. Therefore, the detailed description as described above is not to be taken in a limiting sense.

Various operations may be described as multiple discrete actions or operations in turn, in a manner that is most helpful in understanding the subject matter disclosed herein. However, the order of description should be construed as to imply that these operations are necessarily order dependent. In particular, these operations may not be performed in the order of presentation. Operations described may be performed in a different order from the described implementation. Various additional operations may be performed, and/or described operations may be omitted in additional implementations.

Unless otherwise defined, all technical and scientific terms used herein have the same meaning as commonly understood by one of ordinary skill in the art. In case of conflict, the present document, including definitions, will control. Example methods and systems are described below, although methods and systems similar or equivalent to those described herein can be used in practice or testing of the present disclosure. The systems, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "an" and "the" include plural references unless the context clearly dictates otherwise.

The modifier "about" used in connection with a quantity is inclusive of the stated value and has the meaning dictated by the context (for example, it includes at least the degree of error associated with the measurement of the particular quantity). The modifier "about" should also be considered as disclosing the range defined by the absolute values of the two endpoints. For example, the expression "from about 2 to about 4" also discloses the range "from 2 to 4." The term "about" may refer to plus or minus 10% of the indicated number. For example, "about 10%" may indicate a range of 9% to 11%, and "about 1" may mean from 0.9-1.1. Other meanings of "about" may be apparent from the context, such as rounding off, so, for example "about 1" may also mean from 0.5 to 1.4.

As used herein, the term "or" is intended to mean an inclusive "or" rather than an exclusive "or." That is, unless specified otherwise, or clear from context, "X employs A or B" is intended to mean any of the natural inclusive permutations. That is, if X employs A, X employs B, or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

The present disclosure is now described with reference to the drawings, wherein like reference numerals are used to refer to like elements throughout. In the following description, for purposes of explanation, numbers of specific details are set forth in order to provide an improved understanding of the present disclosure. It may be evident, however, that the systems and methods of the present disclosure may be practiced without one or more of these specific details. In other instances, well-known structures and devices are shown in block diagram form in order to facilitate describing the systems and methods of the present disclosure.

CLAUSES

Implementations of the present disclosure are disclosed in the following clauses:

Clause 1: An optical system for structured illumination, comprising: a first set of optical components fixedly aligned relative to a light beam entering the optical system; and a second set of optical components adjustable between a first operating position and a second operating position, wherein, when the second set of optical components are in the first operating position, the light beam is expanded and outputted as a first output beam, and wherein, when the second set of optical components are in the second operating position, the light beam passes through the first set of optical components and forms a vortex beam that is outputted as a second output beam.

Clause 2: The optical system of clause 1, wherein each optical component of the first set of optical components are aligned along a first optical axis.

Clause 3: The optical system of any of clauses 1-2, wherein the first set of optical components includes a vortex generator.

Clause 4: The optical system of clause 3, wherein the second set of optical components includes at least one beam expander.

Clause 5: The optical system of clause 4, wherein the light beam passes through the first set of optical components when the second set of optical components is in the first operating position.

Clause 6: The optical system of claim 5, wherein the beam expander includes a first lens and a second lens, and when the second set of optical components is in the first operating position, the light beam sequentially passes through the first lens, the vortex generator, and the second lens.

Clause 7: The optical system of clause 6, wherein at the first operating position, the light beam entering the optical system focuses on an intersection point between the first lens and the second lens, and cross-section of beam passing through the vortex generator not greater than 20 mm to 200 mm.

Clause 8: The optical system of clause 7, wherein the vortex generator includes a vortex phase plate and a quarter waveplate, and wherein the intersection point is between the vortex phase plate and the quarter waveplate.

Clause 9: The optical system of clause 8, wherein the first lens and the second lens are separated by 10-14 inches.

Clause 10: The optical system of any of clauses 3-9, wherein the second set of optical components further includes a linear polarizer, and the light beam passes through the linear polarizer before passing through the vortex generator when the second set of optical components is in the second operating position.

Clause 11: The optical system of clause 3, wherein the light beam bypasses the first set of optical components when the second set of optical components is in the first operating position.

Clause 12: The optical system of clause 11, wherein the second set optical components includes at least one mirror, and the light beam is deflected by the mirror to bypass the first set of optical components when the second set of optical components is in the first operating position.

Clause 13: The optical system of any of clauses 1-12, wherein the first output beam and the second output beam are aligned.

Clause 14: The optical system of any of clauses 1-13, wherein the optical components of the second set of optical components are fixedly mounted relative to each other.

Clause 15: The optical system of clause 14, wherein at least one optical component of the second set of optical components is fixedly mounted on a movable structure, and the second set of optical components is adjusted between the first operating position and the second operating position by operating the movable structure.

Clause 16: A structured illumination microscopy system, comprising: a light source configured to generate a light beam; an optical system for structured illumination of any of clauses 1-15 for receiving the light beam and generating the first output beam or the second output beam; at least one actuator to adjust the second set of optical components between the first operating position and the second operating position; an objective to direct either the first output beam or the second output beam to a sample; a detector for receiving light from the sample; and a controller including a processor and a non-transitory memory for storing computer readable instructions, when the computer readable instructions are executed by the processor, the microscopy system is configured to: adjust, via the actuator, the second set of optical components in the first operating position; direct the first output beam towards the sample and generate a first image based on light received from the detector; adjust, via the actuator, the second set of optical components in the second operating position; direct the second output beam towards the sample and generate a second image based on light received from the detector; and generate a sample image based on first image and the second image.

Clause 17: The microscopy system of clause 16, wherein the light from the sample includes Raman shift.

Clause 18: The microscopy system of any of clauses 16-17, wherein at least one optical component of the second set of optical components is fixedly mounted on a movable structure, wherein the movable structure includes a slider, and the actuator is configured to slide the slider to move the second set of optical components between the first operating position and the second operating position.

Clause 19: The microscopy system of any of clauses 16-18, further including a scanner for scanning the first output beam or the second output beam over a sample area to acquire the first sample image and the second sample image.

Clause 20: The microscopy system of clause 19, wherein the microscopy system is configured to scan the second output beam over the sample area before scanning the first output beam over the sample area.

What is claimed is:

1. An optical system for structured illumination, comprising:

a first set of optical components fixedly aligned relative to a light beam entering the optical system, wherein the first set of optical components includes a vortex generator; and a second set of optical components adjustable between a first operating position and a second operating position, wherein the second set of optical components includes at least one beam expander, wherein the beam expander includes a first lens and a second lens, wherein, when the second set of optical components are in the first operating position, the light beam is expanded and outputted as a first output beam, wherein, when the second set of optical components are in the first operating position, the light beam passes through the first set of optical components, such that the light beam sequentially passes through the first lens, the vortex generator, and the second lens, and wherein, when the second set of optical components are in the second operating position, the light beam passes through the first set of optical components and forms a vortex beam that is outputted as a second output beam.

2. The optical system of claim 1, wherein each optical component of the first set of optical components is aligned along a first optical axis.

3. The optical system of claim 1, wherein at the first operating position, the light beam entering the optical system focuses on an intersection point between the first lens and the second lens, and cross-section of beam passing through the vortex generator not greater than 20 mm to 200 mm.

4. The optical system of claim 3, wherein the vortex generator includes a vortex phase plate and a quarter waveplate, and wherein the intersection point is between the vortex phase plate and the quarter waveplate.

5. The optical system of claim 4, wherein the first lens and the second lens are separated by 10 to 14 inches.

6. The optical system of claim 1, wherein the second set of optical components further includes a linear polarizer, and the light beam passes through the linear polarizer before passing through the vortex generator when the second set of optical components is in the second operating position.

7. The optical system of claim 1, wherein the light beam bypasses the first set of optical components when the second set of optical components is in the first operating position.

8. The optical system of claim 7, wherein the second set optical components include at least one mirror, and the light beam is deflected by the mirror to bypass the first set of optical components when the second set of optical components is in the first operating position.

9. The optical system of claim 1, wherein the first output beam and the second output beam are aligned.

10. The optical system of claim 1, wherein the optical components of the second set of optical components are fixedly mounted relative to each other.

11. The optical system of claim 10, wherein at least one optical component of the second set of optical components is fixedly mounted on a movable structure, and the second set of optical components is adjusted between the first operating position and the second operating position by operating the movable structure.

12. A structured illumination microscopy system, comprising:

a light source configured to generate a light beam;

an optical system for structured illumination, including a first set of optical components fixedly aligned relative the light beam entering the optical system, and a second set of optical components adjustable between a first operating position and a second operating position, wherein, when the second set of optical components are in the first operating position, the light beam is expanded and outputted as a first output beam, and wherein, when the second set of optical components are in the second operating position, the light beam passes through the first set of optical components and forms a vortex beam that is outputted as a second output beam;

at least one actuator to adjust the second set of optical components between the first operating position and the second operating position;

an objective to direct either the first output beam or the second output beam to a sample;

a detector for receiving light from the sample;

and a controller including a processor and a non-transitory memory for storing computer readable instructions, when the computer readable instructions are executed by the processor, the microscopy system is configured to:

adjust, via the actuator, the second set of optical components in the first operating position;

direct the first output beam towards the sample and generate a first image based on light received from the detector;

adjust, via the actuator, the second set of optical components in the second operating position;

direct the second output beam towards the sample and generate a second image based on light received from the detector; and generate a sample image based on first image and the second image.

13. The microscopy system of claim 12, wherein the light from the sample includes Raman shift.

14. The microscopy system of claim 12, wherein at least one optical component of the second set of optical components is fixedly mounted on a movable structure, wherein the movable structure includes a slider, and the actuator is configured to slide the slider to move the second set of optical components between the first operating position and the second operating position.

15. The microscopy system of claim 12, further including a scanner for scanning the first output beam or the second output beam over a sample area to acquire the first sample image and the second sample image.

16. The microscopy system of claim 15, wherein the microscopy system is configured to scan the second output beam over the sample area before scanning the first output beam over the sample area.

* * * * *